United States Patent
Gowda et al.

(10) Patent No.: US 12,504,999 B2
(45) Date of Patent: Dec. 23, 2025

(54) LCS WORKLOAD IN-BAND SERVICE MANAGEMENT SYSTEM

(71) Applicant: Dell Products L.P., Round Rock, TX (US)

(72) Inventors: Srinivas Giri Raju Gowda, Santa Clara, CA (US); Shyamkumar T. Iyer, Cedar Park, TX (US); Gaurav Chawla, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 630 days.

(21) Appl. No.: 17/837,285

(22) Filed: Jun. 10, 2022

(65) Prior Publication Data

US 2023/0401107 A1    Dec. 14, 2023

(51) Int. Cl.
*G06F 9/50* (2006.01)
*G06F 9/54* (2006.01)

(52) U.S. Cl.
CPC .......... *G06F 9/5083* (2013.01); *G06F 9/547* (2013.01)

(58) Field of Classification Search
CPC ....... G06F 9/5083; G06F 9/547; G06F 9/5005
See application file for complete search history.

(56) References Cited

U.S. PATENT DOCUMENTS

| | | | | |
|---|---|---|---|---|
| 10,848,596 B2 * | 11/2020 | Mimran | ............... | H04L 67/63 |
| 11,989,586 B1 * | 5/2024 | Srikanta | ............... | G06F 9/505 |
| 2016/0119405 A1 * | 4/2016 | Karpoor | ............... | G06Q 10/06 709/217 |
| 2018/0131583 A1 * | 5/2018 | Barrows | ............... | H04L 67/306 |
| 2019/0116128 A1 * | 4/2019 | Guo | ............... | H04L 67/1021 |
| 2021/0373790 A1 * | 12/2021 | Henderson | ............ | G06F 3/0604 |
| 2021/0409270 A1 | 12/2021 | Bursell | | |
| 2022/0191269 A1 * | 6/2022 | Thuma | ............... | H04L 43/06 |
| 2022/0318433 A1 * | 10/2022 | McLean | ............... | G06F 21/1013 |
| 2023/0109690 A1 * | 4/2023 | Mutha | ............... | G06F 9/5083 718/1 |
| 2023/0123860 A1 * | 4/2023 | Marquie | ............ | G06F 16/24575 719/328 |
| 2023/0177201 A1 * | 6/2023 | Durand | ............... | G06F 21/6227 726/4 |

* cited by examiner

*Primary Examiner* — Chat C Do
*Assistant Examiner* — Tuan M Nguyen
(74) *Attorney, Agent, or Firm* — Joseph Mencher

(57) ABSTRACT

A Logically Composed System (LCS) workload in-band service management system includes a service management subsystem coupled to a workload that is provided using a Logically Composed System (LCS), and a System Control Processor (SCP) device. The service management subsystem determines a plurality of services that are either provided by or available via the SCP device for use by the LCS, and presents a service library to the workload that identifies the plurality of services. If the service management subsystem receives a first service request from the workload for a first service that is included in the plurality of service identified in the service library, it provides a first service provisioning request to the SCP device that is configured to cause the SCP device to provide the first service to the LCS for utilization by the workload.

20 Claims, 17 Drawing Sheets

LCS WORKLOAD IN-BAND SERVICE MANAGEMENT SYSTEM

BACKGROUND

The present disclosure relates generally to information handling systems, and more particularly to in-band management of services by workloads on Logically Composed Systems(s) that are provided using information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

While conventional information handling systems such as, for example, server devices and/or other computing devices known in the art have traditionally been provided with particular information handling systems components that configure it to satisfy one or more use cases, new computing paradigms provide for the allocation of resources from information handling systems and/or information handling system components for use in Logically Composed Systems (LCSs) that may be composed as needed to satisfy any computing intent/workload, and then decomposed such that those resources may be utilized in other LCSs. As such, users of the LCSs may be provided with LCSs that meet their current needs for any particular workload they require.

For example, an LCS may be provided using a resource system such as a Bare Metal Server (BMS) system, with a processing system and memory system in the BMS system used to provide an Operating System (OS) for the LCS, and resource devices included in that BMS system and/or outside of that BMS system provided for use by a workload provided by the OS and/or other applications. For example, conventional LCS systems may be "composed" by a resource management system based on a "computing intent" expressed by a user, with the resource management system operating to define the LCS, resource devices, and services provided for use by its workloads, which can raise some issues. For example, workloads may have dynamic service requirements, but workloads are not configured to perform "out-of-band" communications with the resource management system, and thus do not have the ability to discover, modify, or otherwise manage services provided to their LCS. As such, conventional LCSs are limited following their composition, and thus may result in inefficient performance by a workload for which they were composed, particularly when the service requirements for that workload change.

Accordingly, it would be desirable to provide an LCS workload in-band service management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a service management engine that is configured to: determine a plurality of services that are either provided by or available via a System Control Processor (SCP) device for use by a Logically Composed System (LCS); present, to a workload provided using the LCS, a service library that identifies the plurality of services; receive, from the workload, a first service request for a first service that is included in the plurality of service identified in the service library; and provide, to the SCP device, a first service provisioning request that is configured to cause the SCP device to provide the first service to the LCS for utilization by the workload.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
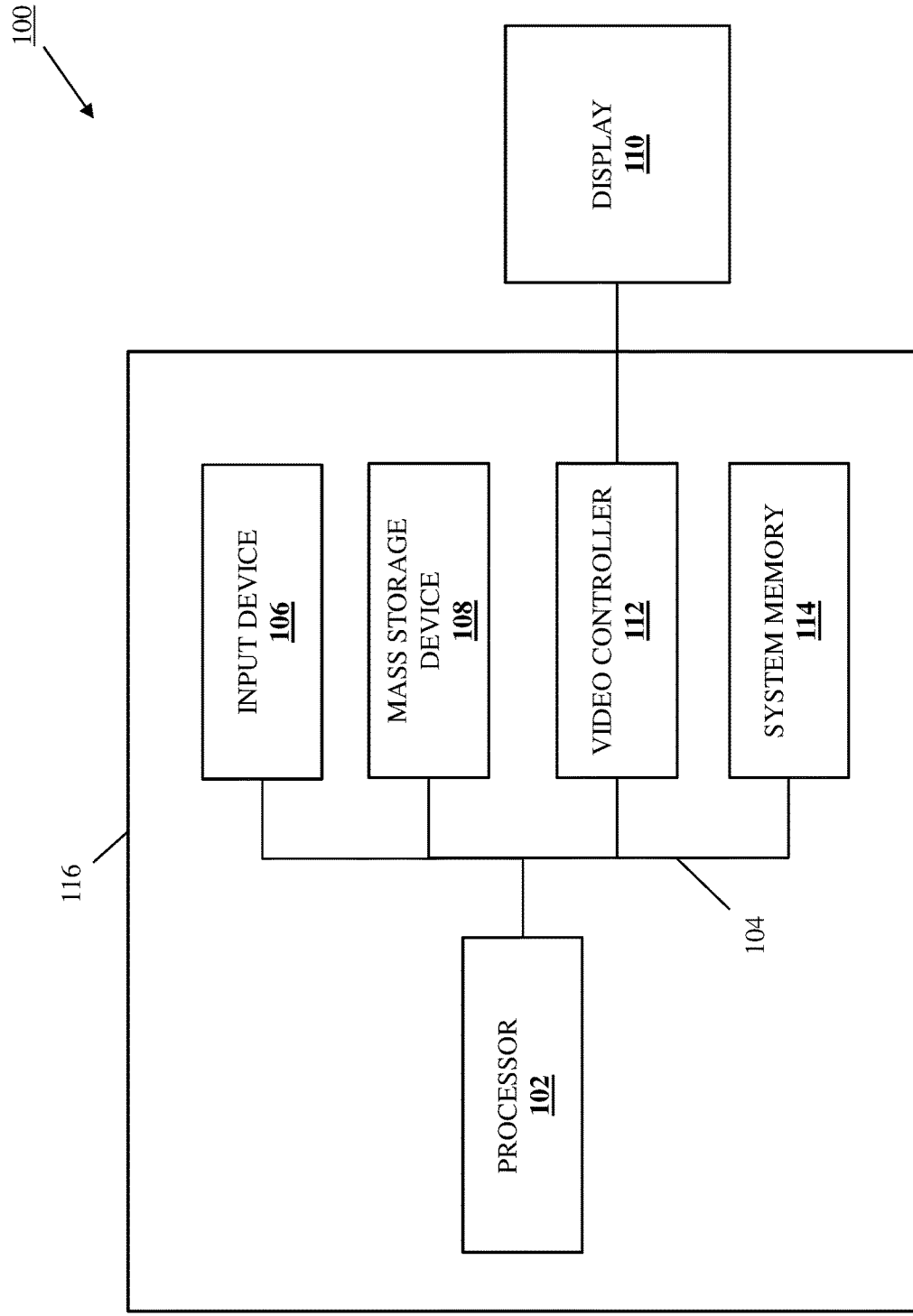
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the Logically Composed System (LCS) workload in-band service management systems and methods of the present disclosure may be utilized with Logically Composed Systems (LCSs), which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
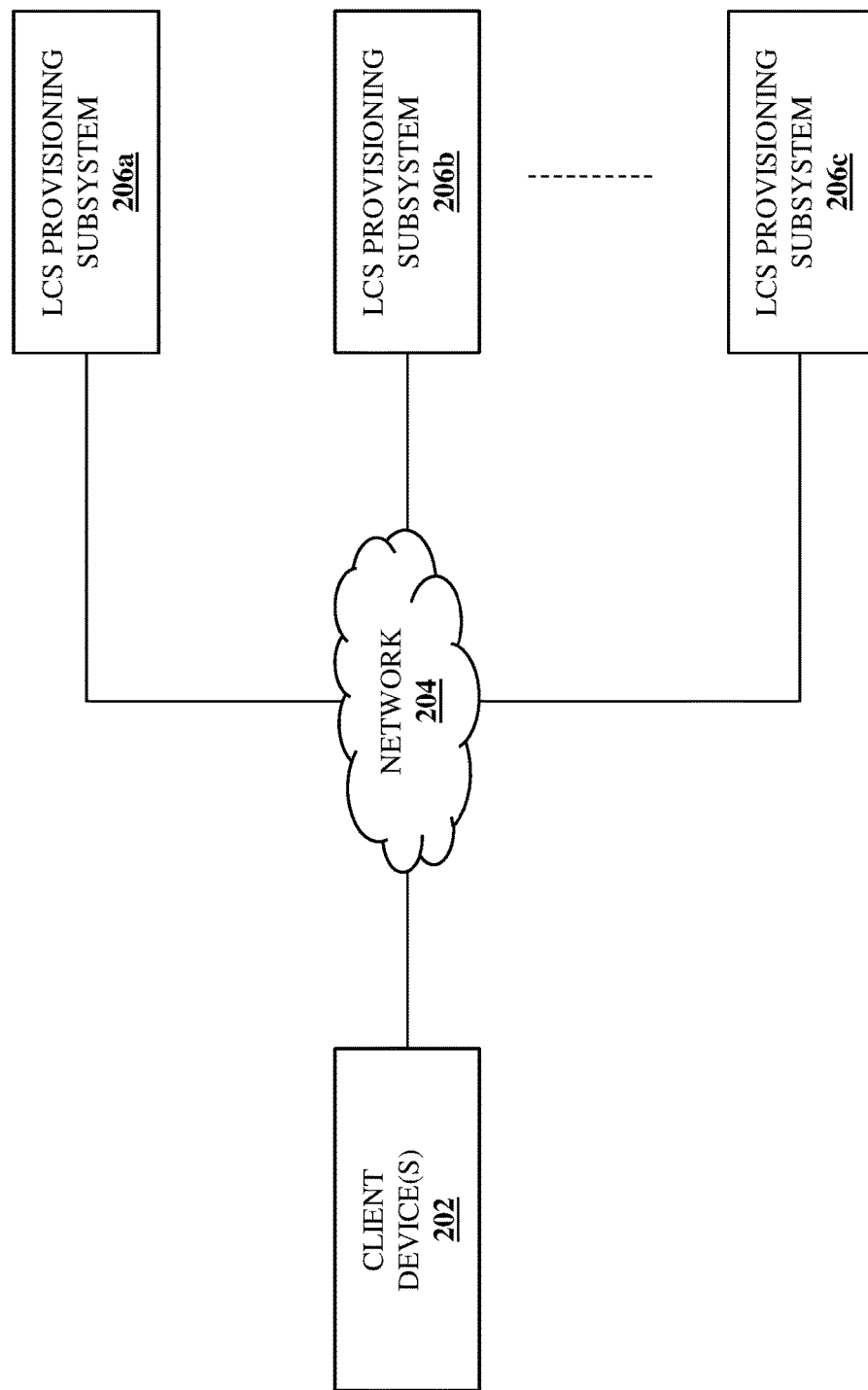
FIG. 2 is a schematic view illustrating an embodiment of an LCS provisioning system.

With reference to FIG. 2, an embodiment of an LCS provisioning system 200 is illustrated that may be utilized with the LCS workload in-band service management systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
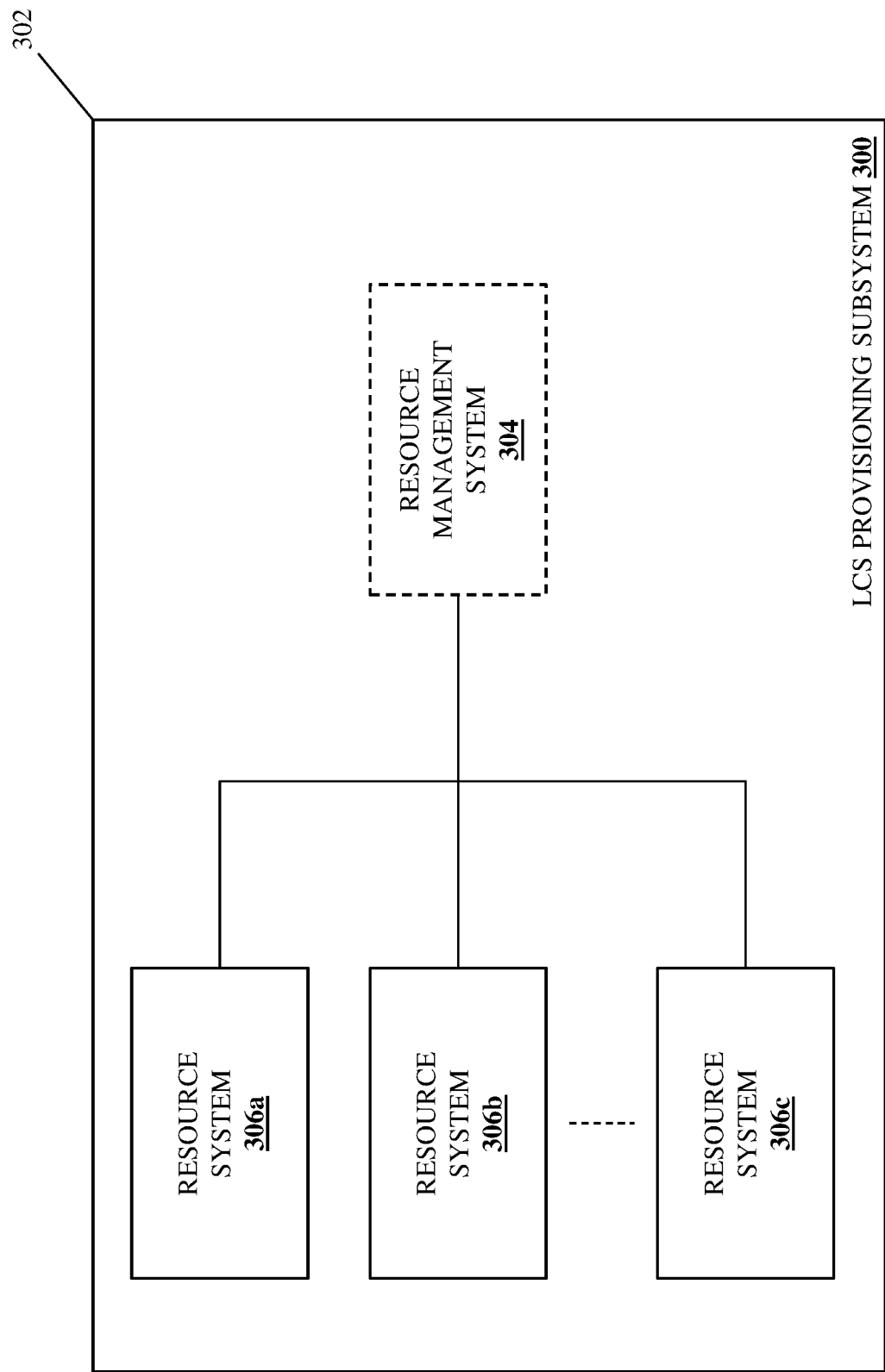
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource management systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include a System Control Processor (SCP) device that may be conceptualized as an "enhanced" SmartNIC device that may be configured to perform functionality that is not available in conventional SmartNIC devices such as, for example, the resource management functionality, LCS provisioning functionality, and/or other SCP functionality described herein.

In an embodiment, any of the resource systems 306a-306c may include any of the resources described below coupled to an SCP device that is configured to facilitate management of those resources by the resource management system 304. Furthermore, the SCP device included in the resource management system 304 may provide an SCP Manager (SCPM) subsystem that is configured to manage the SCP devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem discussed below may be provided by a dedicated SCP device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem may be provided by an SCP device, processing/memory resources, and/or any other any other components om that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices in the resource systems 306a-306c may operate to "elect" or otherwise select one or more of those SCP devices to operate as the SCPM subsystem described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
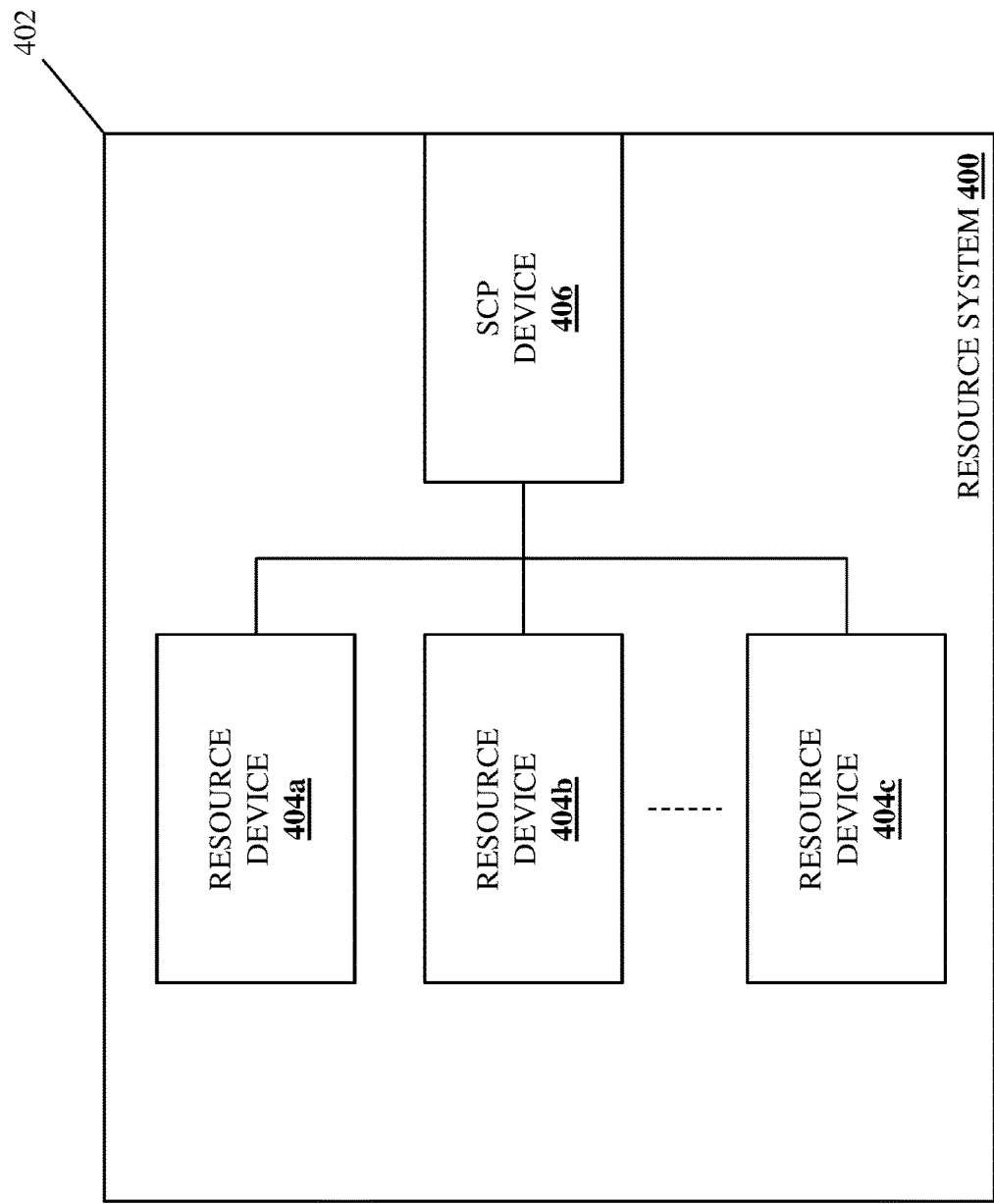
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406. In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may operate to provide a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. Further, as discussed below, the SCP devices describe herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciate that functionality described herein may be enabled on other devices while remaining within the scope of the present disclosure as well.

Thus, the resource source system 400 may include the chassis 402 including the SCP device 406 connected to any combinations of resource devices. To provide a specific embodiment, the resource system 400 may provide a "Bare Metal Server" (BMS) that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art (also referred to as "services" in the examples described below), and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality/services are described herein, one of skill in the art in possession of the present disclosure will appreciate how the SCP devices 406 described herein may allocate SCP hardware and/or perform other enhanced functionality/services for an LCS provided via allocation of its resource devices 404a-404c while remaining within the scope of the present disclosure as well.

Figure 5:
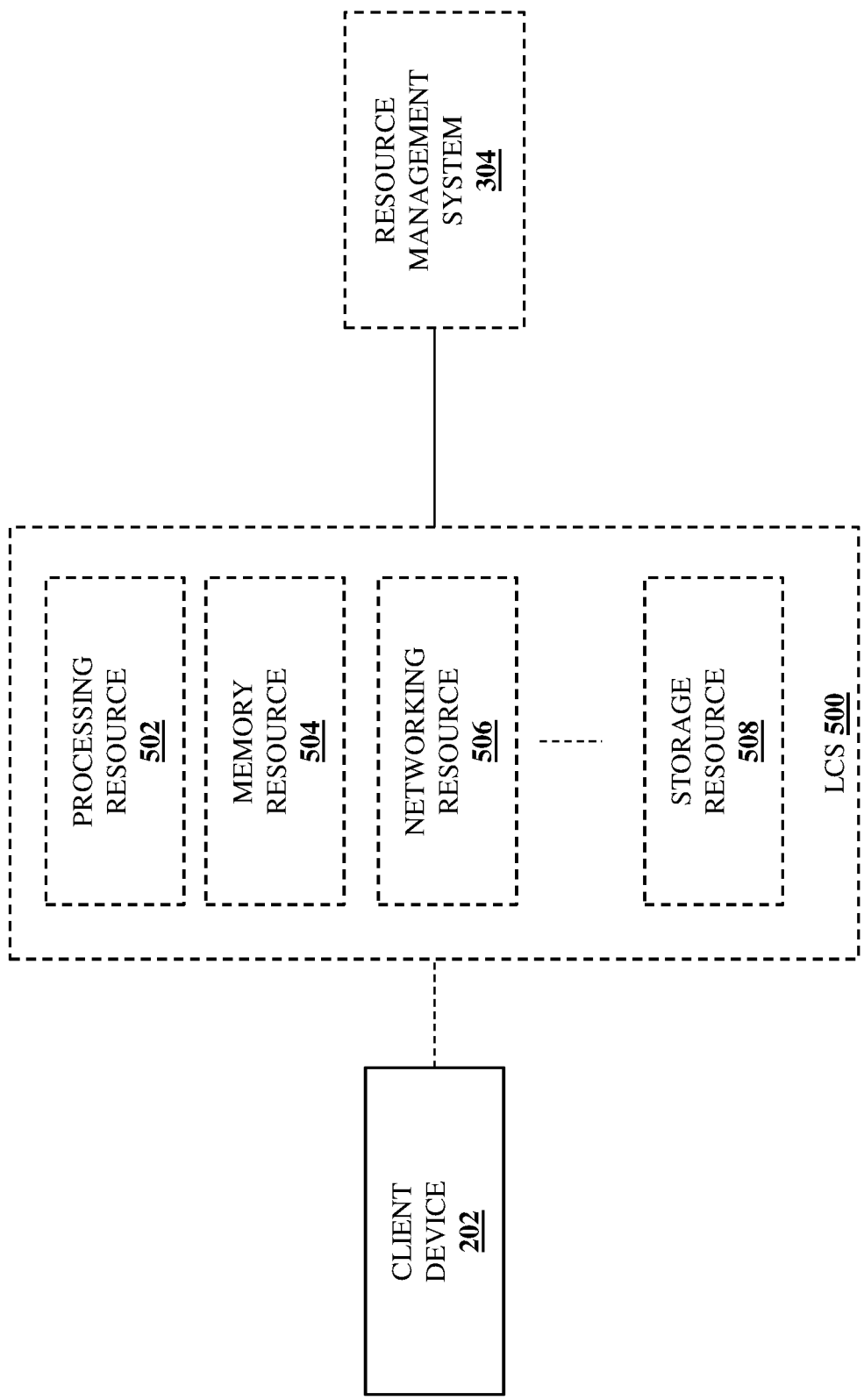
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TB s of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality/services (e.g., the enhanced storage functionality/service in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TB s of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
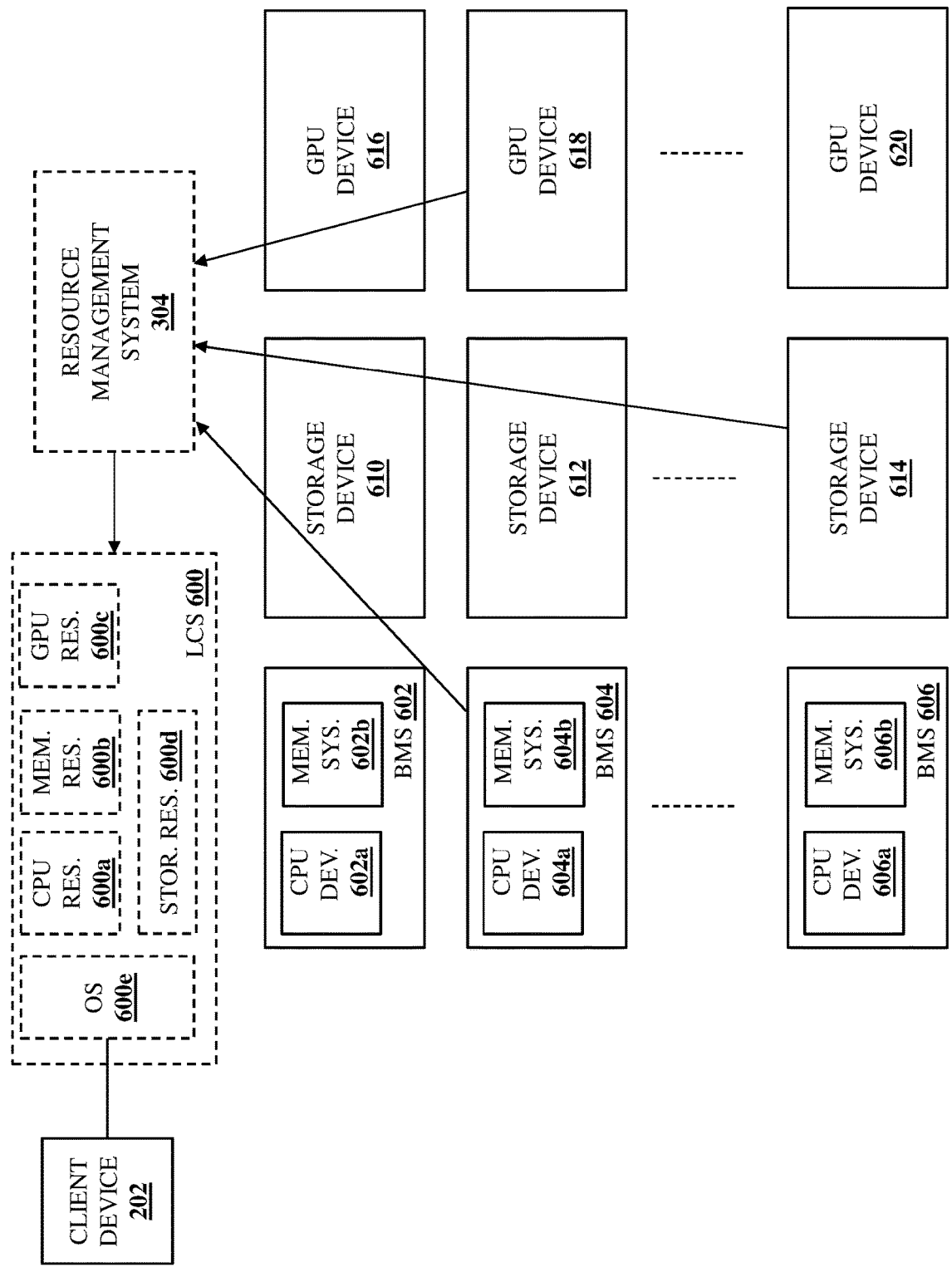
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600d, and using the GPU device 318 to provide the LCS 600 with GPU resources 600c. As illustrated in the specific example in FIG. 6, the CPU device 604a and the memory system 604b in the BMS 604 may be configured to provide an operating system 600e (and/or other application) that is presented to the client device 202 as being provided by the CPU resources 600a and the memory resources 600b in the LCS 600, with operating system 600e utilizing the GPU device 618 to provide the GPU resources 600c in the LCS 600, and utilizing the storage device 614 to provide the storage resources 600d in the LCS 600. The user of the client device 202 may then provide any application(s) on the operating system 600e provided by the CPU resources 600a/CPU device 604a and the memory resources 600b/memory system 604b in the LCS 600/BMS 604, with the application(s) operating using the CPU resources 600a/CPU device 604a, the memory resources 600b/memory system 604b, the GPU resources 600c/GPU device 618, and the storage resources 600d/storage device 614, as well as any services provided by those resource devices.

Furthermore, as discussed above, the SCP device(s) 406 in the resource systems 306a-306c/400 that allocates any of the CPU device 604a and memory system 604b in the BMS 604 that provide the CPU resource 600a and memory resource 600b, the GPU device 618 that provides the GPU resource 600c, and the storage device 614 that provides storage resource 600d, may also allocate SCP hardware and/or perform enhanced functionality/services (e.g., the enhanced storage functionality/service in the specific examples provided above) for any of those resources that may otherwise not be available in the CPU device 604a, memory system 604b, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600c may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600a, the memory resources 600b, the GPU resources 600c, and the storage resources 600d, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being under-utilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

As discussed above, workloads provided by an operating system and/or other application provided using an LCS may have dynamic service requirements, but such workloads are not configured to perform "out-of-band" communications with the resource management system 304, and thus do not have the ability to discover, modify, or otherwise manage services provided to their LCS. As such, conventional LCSs are limited following their composition, and thus provide for the inefficient performance of a workload for which they were composed, particularly when the service requirements for that workload change. In order to remedy such issues, the inventors of the present disclosure have developed systems and methods for enabling "in-band" management of services by a workload which, as discussed below, provide for the direct identification to the workload of services that are available to the LCS for use by that workload, thus allowing that workload to directly request the provisioning of any of those services as its service requirements change without the need to directly communication "out-of-band" with the resource management system 304.

Figure 7:
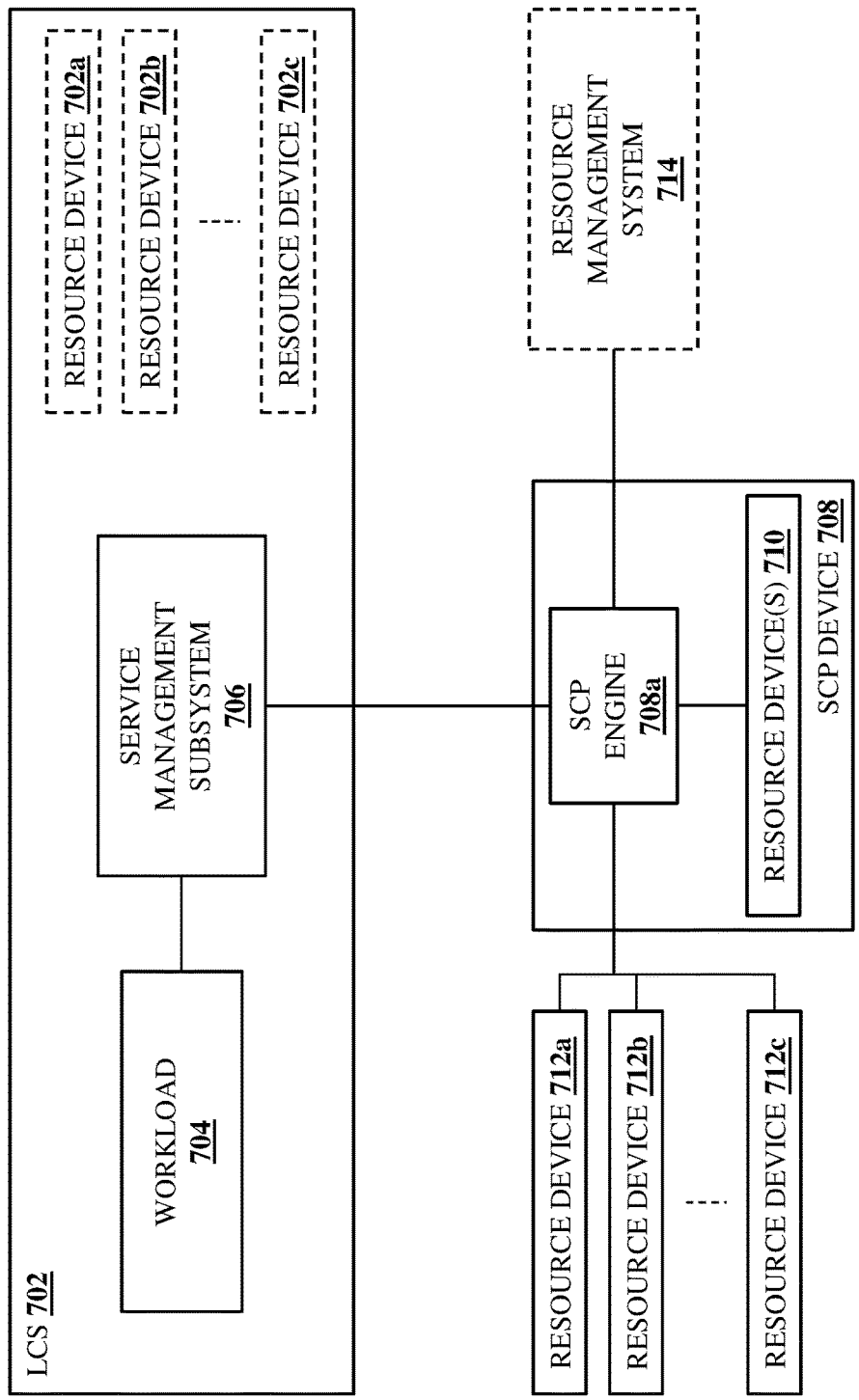
FIG. 7 is a schematic view illustrating an embodiment of an LCS workload in-band service management system provided according to the teachings of the present disclosure.

Referring now to FIG. 7, an embodiment of an LCS workload in-band service management system 700 is illustrated that may be provided according to the teachings of the present disclosure. In the illustrated embodiment, the LCS workload in-band service management system 700 includes an LCS 702 that one of skill in the art in possession of the present disclosure will recognize may be provided similarly as any of the LCSs discussed above. In the illustrated embodiment, the LCS 702 is provided using a plurality of resource devices 702a, 702b, and up to 702c, with those resource devices 702a-702c illustrated in dashed lines to indicate how those resource devices 702a-702c may be provided from any of a variety of the resource systems described above. As such, one of skill in the art in possession of the present disclosure will recognize how any of the resource devices 702a-702c (e.g., the processing systems and memory systems discussed above) may be utilized to provide an operating system and/or other applications that then operate to provide a workload 704 on the LCS 702 that is configured to utilize services provided by any of the resource devices 702a-702c.

The LCS 702 also includes a service management subsystem 706, which one of skill in the art in possession of the present disclosure will appreciate may be provided by a processing system (e.g., one of the resource devices 702a-702c) and a memory system (e.g., one of the resource devices 702a-702c) that is coupled to the processing system and that includes instructions that, when executed by the processing system, cause the processing system to provide the service management subsystem 706 that is configured to perform the functionality of the service management engines and/or service management subsystems discussed below. In an embodiment, the service management subsystem 706 may include an LCS device driver, an Application Programming Interface (API) service, application plug-in subsystems (e.g., Kubernetes plug-in subsystems) in embodiments in which applications are not configured to utilize the API service without them, and/or any other service management components that one of skill in the art in possession of the present disclosure would recognize as providing for the service management functionality discussed above. To provide a specific example, the LCS device driver discussed above may be configured to present a service library (e.g., an service "abstraction layer" that includes the service library discussed below) to the workload 704 (e.g., which is provided by an operating system and/or applications), with the workload utilizing one of the application plug-in subsystems discussed above to interface with the API service discussed above to generate API calls to services identified in the service library, and with the SCP engine 708a in the SCP device 708 operating as an API endpoint for those API calls. However, while a specific LCS 702 and service management subsystem 706 have been described, one of skill in the art in possession of the present disclosure will appreciate how LCSs and service management subsystems may be provided using a variety of techniques that will fall within the scope of the present disclosure as well.

In the illustrated embodiment, the LCS workload in-band service management system 700 also includes an SCP device 708 that may be provide by any of the SCP devices discussed above. For example, the SCP device 708 may be provided in the resource system/BMS system that includes the resource devices (e.g., the processing system and memory system) that are used to provide the workload 704 (e.g., provided by an operating system and/or application) in the LCS 702 described herein, although one of skill in the art in possession of the present disclosure will appreciate how other SCP devices may be utilized to provide the SCP device 708 while remaining within the scope of the present disclosure as well. In an embodiment, the SCP device 708 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine 708a that is configured to perform the functionality of the SCP engines and/or SCP devices discussed below.

As illustrated, the SCP device 708 may include one or more resource devices 710 that are coupled to the SCP engine 708a (e.g., via a coupling between the resource device(s) 710 and the processing system that provides the SCP engine 708a) and that, as discussed above, may configured to perform services that may be provided to LCSs. Furthermore, the LCS workload in-band service management system 700 also includes a plurality of resource devices 712a, 712b, and up to 712c that are coupled to the SCP engine 708a (e.g., via a coupling between the resource device(s) 710 and the processing system that provides the SCP engine 708a) and that, as discussed above, may be configured to perform services that may be provided by the SCP device 708 to LCSs. In the specific examples below, the SCP device 708 provides the resource devices 702a-702c to the LCS 702 (with the resource devices 702a-702c located either within or outside of the resource system/BMS system that includes the SCP device 708 and the processing system/memory system that provide an operating system for the LCS 702, as discussed above), while the resource devices 710 and 712a-712c are configured to perform services that are available for use by the LCS 702 but are not initially provided to the LCS 702 (i.e., upon the composition of the LCS 702 using the resource devices 702a-702c). However, while a specific example of resources devices provided to an LCS 702, and services available from resource devices that are available to an LCS 702, is illustrated and described, one of skill in the art in possession of the present disclosure will appreciate how an LCS may be composed using resource devices and have services available to it in a variety of manners that will fall within the scope of the present disclosure as well.

In the illustrated embodiment, the LCS workload in-band service management system 700 also includes a resource management system 714 that is coupled to the SCP engine 708a (e.g., via a coupling between the processing system that provides the resource management system 714 and the processing system that provides the SCP engine 708a), and that may be provided by the resource management system 304 discussed above. As such, the resource management system 714 may be provided by an SCPM device, which as discussed above may be a "stand-alone" SCPM device, or an SCPM device elected from one of a plurality of SCP devices (i.e., including the SCP device 708 in some examples). However, while a specific LCS workload in-band service management system 700 has been illustrated and described, one of skill in the art in possession of the present disclosure will recognize that the LCS workload in-band service management system provided according to the teachings of the present disclosure may include a variety of components and/or component configurations for providing LCS functionality, as well as the functionality discussed below, while remaining within the scope of the present disclosure as well.

Figure 8:
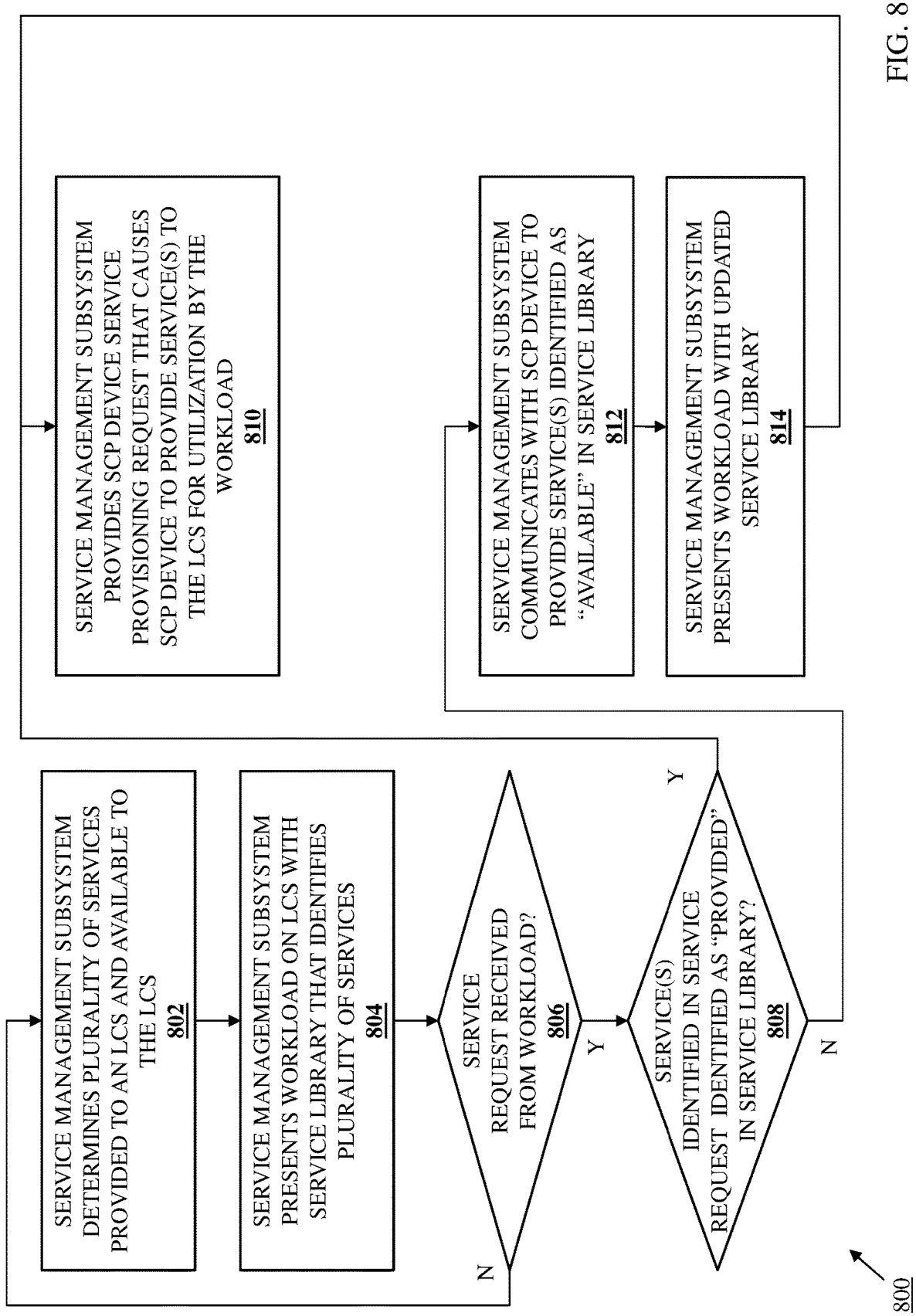
FIG. 8 is a flow chart illustrating an embodiment of a method for in-band management of services by a workload provided on an LCS.

Referring now to FIG. 8, an embodiment of a method 800 for in-band management of services by a workload provided on an LCS is illustrated. As discussed below, the systems and methods of the present disclosure provide for the identification of services to a workload on an LCS, as well as the enablement of in-band management of those services by the workload. For example, the LCS workload in-band service management system of the present disclosure may include a service management subsystem coupled to a workload that is provided using an LCS, and an SCP device. The service management subsystem determines a plurality of services that are available via the SCP device for use by the LCS, and presents a service library to the workload that identifies the plurality of services. If the service management subsystem receives a first service request from the workload for a first service that is included in the plurality of service identified in the service library, it provides a first service provisioning request to the SCP device that is configured to cause the SCP device to provide the first service to the LCS for utilization by the workload. As such, the workload on the LCS may utilize in-band communications to request services in order to be provided those services as its service requirements change.

As discussed above, the LCS provisioning system of the present disclosure allows various services to be provisioned to an LCS and its workload(s) via a resource management system such as the SCPM device discussed above. However, workloads on LCSs may not utilize services (e.g., accelerator services provided by an accelerator resource device) provided to their LCS (e.g., during any particular operating state of that workload, according to any particular service requirements of that workload, etc.). As such, many LCSs may not require "hard" provisioning of services provided by resource devices (e.g., dedicating those services to LCSs), and rather that LCS and/or the LCS provisioning system may benefit from "thin" provisioning of services provided by resource devices (e.g., provisioning only services that are currently needed by LCSs). For example, one of skill in the art in possession of the present disclosure will appreciate how LCSs and/or the LCS system may benefit from the "thin" provisioning of storage resources (e.g., a storage volume), while introducing storage scheduling efficiencies to the LCS provisioning system.

One of skill in the art in possession of the present disclosure will appreciate how the systems and methods of the present disclosure discussed below enable such "thin" provisioning, allowing workloads to request the use of any particular service provided by a resource device in response to workload service requirement changes (e.g., using snapshot services on a storage volume when needed, using encryption services on data when needed, using compression service on data when needed, etc.). As discussed below, the dynamic advertisement of services to workloads via a service library allows services that may not have been available during the composition of the LCS to be identified to a workload provided by the LCS, thus allowing the workload to discover services as they become available. and perform in-band workload-driven (i.e., operating-system-driven/application-driven) service management during its operations.

Figure 9:
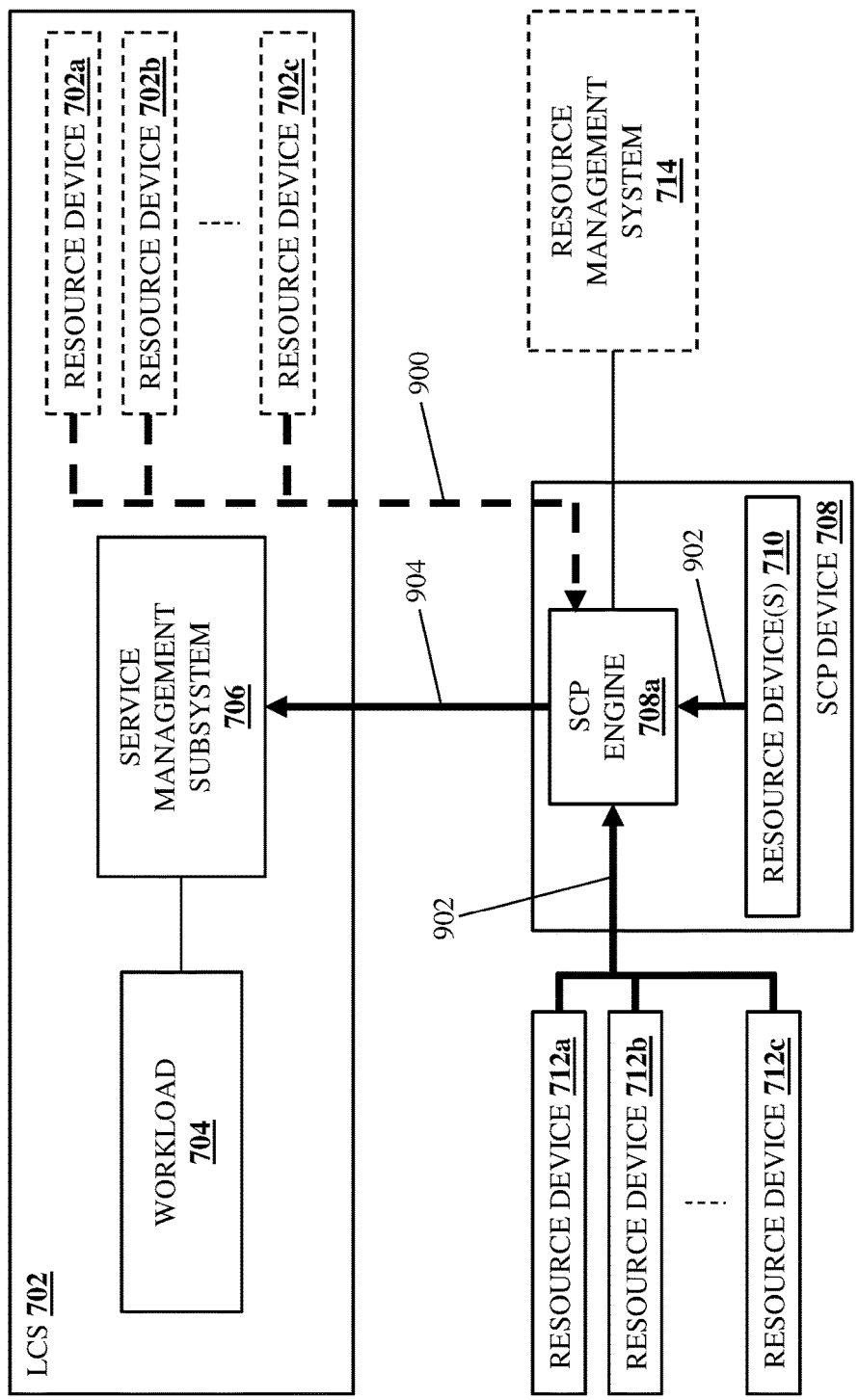
FIG. 9 is a schematic view illustrating an embodiment of the LCS workload in-band service management system of FIG. 7 operating during the method of FIG. 8.

The method 800 begins at block 802 where a service management subsystem determines a plurality of services provided to an LCS and available to the LCS. With reference to FIG. 9, in an embodiment of block 802, the SCP engine 708a in the SCP device 708 may perform provided-service identification operations 900 that include identifying the services performed by the resource devices 702a-702c that are currently being used to provide the LCS 702 and/or that are currently provided for utilization by the workload 704. As will be appreciated by one of skill in the art in possession of the present disclosure, the SCP engine 708a in the SCP device 708 may have previously operated (e.g., with the resource management system 714 provided by, for example, an SCPM device as discussed above) to compose the LCS 702 using the resource devices 702a-702c, and thus the identification of the services available from those resource devices 702a-702c that are being used to provide the LCS 702 and/or that are provided for utilization by the workload 704 may include identifying those services in a database that is accessible to the SCP engine 708a. However, while specific techniques for identifying services provided by resource devices that are being used to provide an LCS and/or that are provided for utilization by a workload on an LCS have been described, one of skill in the art in possession of the present disclosure will appreciate that other techniques for such provided-service identification will fall within the scope of the present disclosure as well.

With continued reference to FIG. 9, in an embodiment of block 802, the SCP engine 708 in the SCP device 708 may perform available service identification operations 902 that include identifying the services available from the resource devices 710 and 712a-712c that are available to the LCS 702 and/or the workload 704. As discussed above, the SCP engine 708a in the SCP device 708 is coupled to resource devices that are not currently provided to the LCS 702 and/or the workload 704 but that are available to the LCS 702 and/or the workload 704, and in a specific example the identification of the services provided by the resource devices 702a-702 that are available to the LCS 702 and/or that are available for utilization by the workload 704 may include the identification of services provided by resource devices 710 and 712a-712c that are both coupled to the SCP engine 708a and authorized for use by the LCS 702 and/or the workload. For example, the LCS 702 and/or the workload 704 may be defined (e.g., by the resource management system 714 as discussed above) as being authorized to utilize particular services provided by resource devices, and thus the SCP engine 708a in the SCP device 708 may only identify those particular services as being available to the LCS 702 and/or the workload 704. However, while specific techniques for identifying services that are available to an LCS and/or that are available for utilization by a workload on an LCS have been described, one of skill in the art in possession of the present disclosure will appreciate that other techniques for such available-service identification will fall within the scope of the present disclosure as well.

In some embodiments, the available service identification operations 902 may include the SCP engine 708 in the SCP device 708 identifying attributes of resources that are providing the services that are identified as available at block 802, which one of skill in the art in possession of the present disclosure will appreciate may be utilized to determine whether a service request (discussed below) may be satisfied. For example, such attributes may include any details about the resources that allow the SCP device 708 to identify an available service. As will be appreciated by one of skill in the art in possession of the present disclosure, in the event such attributes are unavailable, a resource device including such attribute may need to be discovered in order to satisfy service requests for a corresponding service provided by such attributes. Furthermore, services identified at block 802 may include stateless or stateful services, with stateless or stateful services available from resource devices that are shared between multiple LCSs.

With continued reference to FIG. 9, in an embodiment of block 802, the SCP engine 708a may perform identified service identification operations 904 in order to identify the provided services and the available services to the service management subsystem 706. As such, following the identification of the provided services and/or the available services as discussed above, the SCP engine 708a in the SCP device 708 may identify those provided services and/or available services to the service management subsystem 706 using any of a variety of techniques that would be apparent to one of skill in the art in possession of the present disclosure, and thus the service management subsystem 706 may determine the services performed by the resource devices 702a-702c that are currently being provided via the SCP device 708 for the LCS 702, and/or the services available from the resource devices 710 and 712a-712c that are available (but not currently being provided) via the SCP device 708 to the LCS 702, via the identification of those services by the SCP device 708 as described above.

Figure 10:
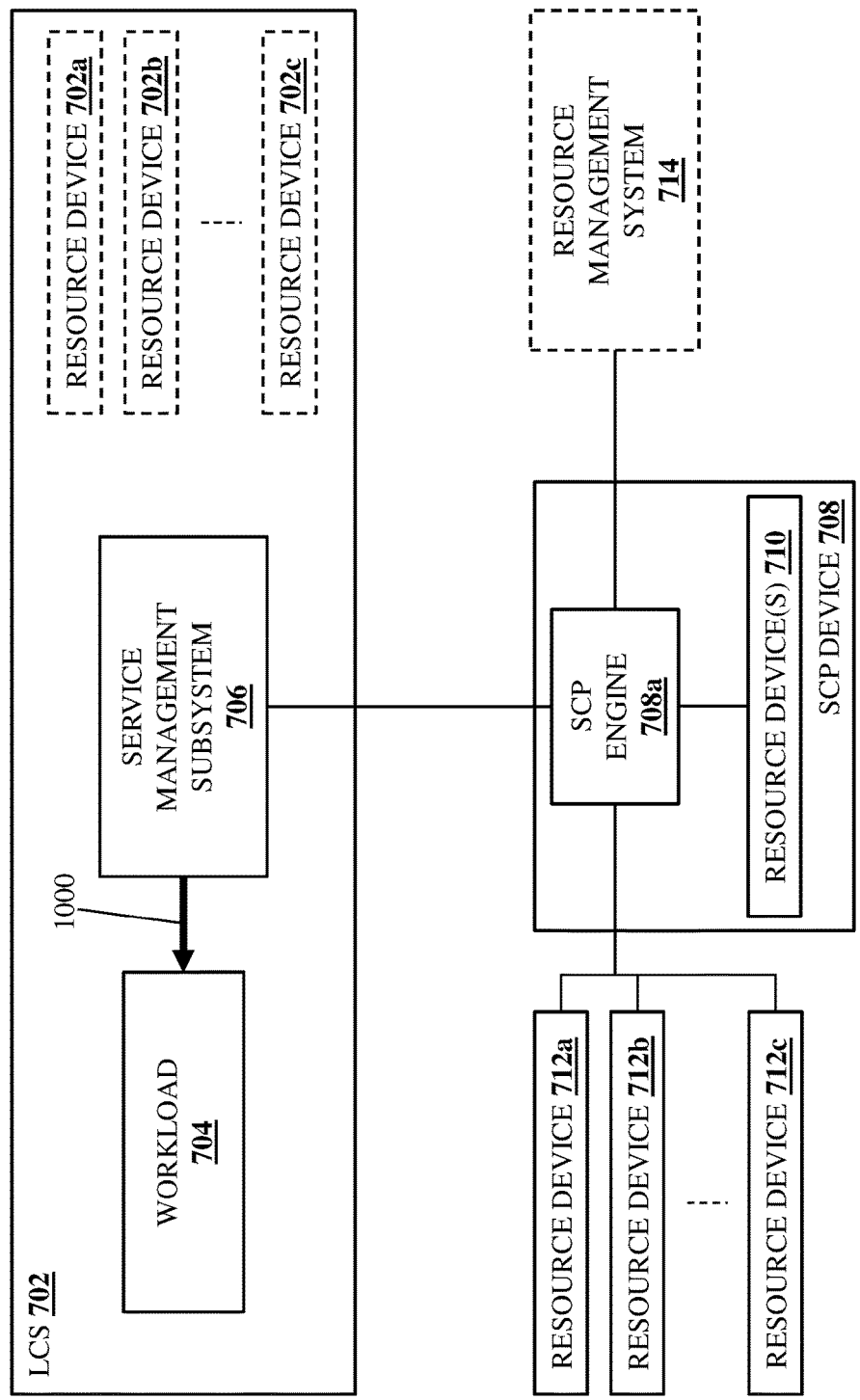
FIG. 10 is a schematic view illustrating an embodiment of the LCS workload in-band service management system of FIG. 7 operating during the method of FIG. 8.

The method 800 then proceeds to block 804 where the service management subsystem presents a workload on the LCS with a service library that identifies the plurality of services. With reference to FIG. 10, in an embodiment of block 804, the service management subsystem 706 may perform service library presentation operations 1000 that may include generating a service library that identifies the provided services and the available services that were determined at block 802, and presenting the service library to the workload 704. In a specific example, the service library may be provided by a service layer construct/abstraction layer that, for each identified service, provides service APIs that are native to the operating environment of the LCS (e.g., an environment utilized by operating system and/or application providing the workload 704). For example, the service library presented to the workload 704 at block 804 may identify each provided service and available service discussed above, and may provide respective API information for each of those services. As discussed above, the workload 704 may be configured to interface with the API service provided by the service management subsystem 706 (e.g., utilizing application plug-in subsystem(s) such as a Kubernetes plugin when necessary) to generate API calls to services identified in the service library using their corresponding API information included in that service library, with the SCP engine 708a in the SCP device 708 operating as an API endpoint for those API calls, and thus the service library may include any API information that one of skill in the art in possession of the present disclosure would recognize as allowing for such functionality. However, while a specific service library has been described, one of skill in the art in possession of the present disclosure will appreciate how the service library may identify services in other manners that will fall within the scope of the present disclosure as well.

The method 800 then proceeds to decision block 806 where it is determined whether a service request is received from the workload. As will be appreciated by one of skill in the art in possession of the present disclosure, the workload 704 provided using the LCS 702 (e.g., by an operating system and/or applications provided using that LCS 702) may be configured to request services identified in the service library in the event those service(s) are needed by that workload 704. Continuing with the specific example provided above, in an embodiment of decision block 806, the resource device management subsystem 706 may monitor to determine whether a service request has been received from the workload 704 by determining whether the workload 704 has generated an API call to any service identified in the service library. However, while specific service requests have been described, one of skill in the art in possession of the present disclosure will appreciate how the services may be requested in other manners that will fall within the scope of the present disclosure as well If, at decision block 806, it is determined that a service request was not received from the workload, the method 800 returns to block 802. For example, at decision block 806 the services provided by the resource devices 702a-702c may be satisfying the service requirements of the workload 704 such that the workload 704 does not generate a service request based on the services identified in the service library being presented to it by the service management subsystem 706, and thus the service management subsystem 706 will determine that no service request has been received from the workload 704. As such, the method 800 may loop such that the service management subsystem 706 determines the provided services and available services at block 802 as discussed above, and presents the workload 704 with the service library at block 804 as discussed above, until a service request is received from the workload 704. Thus, one of skill in the art in possession of the present disclosure will appreciate how the service library discussed above may be continuously or periodically updated such that the most current provided services and available services are identified to the workload 704.

Figure 11:
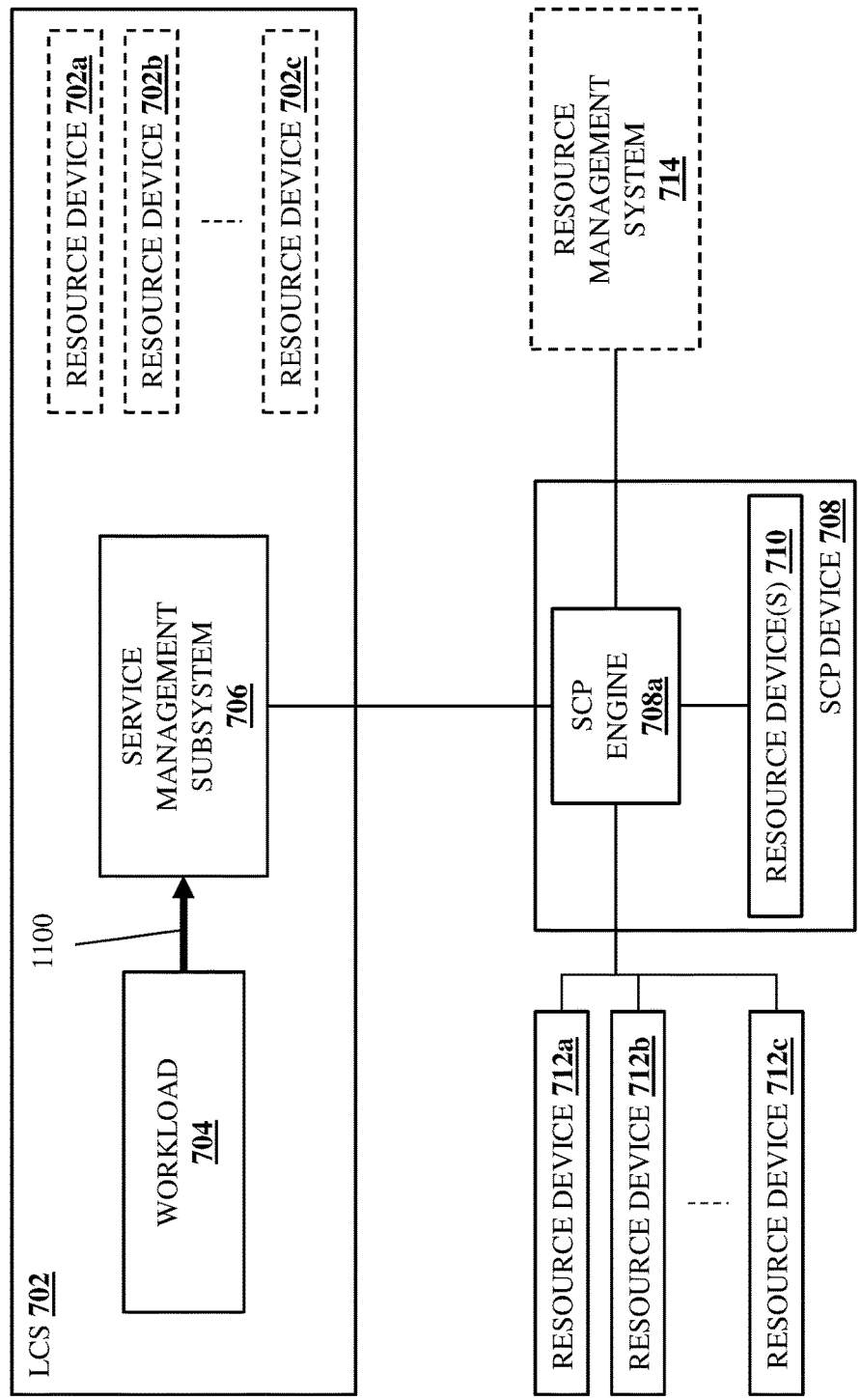
FIG. 11 is a schematic view illustrating an embodiment of the LCS workload in-band service management system of FIG. 7 operating during the method of FIG. 8.

If at decision block 806, it is determined that a service request was received from the workload, the method 800 proceeds to decision block 808 where it is determined the service(s) identified in the service request are identified in the service library as "provided" services. With reference to FIG. 11, in an embodiment of decision block 806, the services provided by the resource devices 702a-702c may not be satisfying the service requirements of the workload 704 such that the workload 704 performs service request provisioning operations 1100 that includes providing a service request for services identified in the service library (e.g., a service provided by the resource device 712c in one of the examples below) to the resource management subsystem 706 such that the resource device management subsystem 706 determines that a service request has been received from the workload 704. As discussed above, the service request may request a service that may be identified as either a "provided" service or an "available" service in the service library, and the method 800 may proceed differently depending on whether the service requested by the service request is identified in the service library as a "provided" service or an "available" service.

If, at decision block 808, it is determined that the service (s) identified in the service request are identified as "provided" service(s) in the service library, the method 800 proceeds to block 810 where the service management subsystem provides the SCP device a service provisioning request that causes the SCP device to have those service(s) performed for the LCS for utilization by the workload. Continuing with the specific example above, in an embodiment of block 806, the operating system or application providing the workload 704 may provide the service request by interfacing with the API service provided by the service management subsystem 706 (e.g., utilizing application plug-in subsystem(s) such as a Kubernetes plugin when necessary) to generate an API call to a service identified as a "provided" service in the service library using its corresponding API information in that service library, and/or performing other operations using the service library that would be apparent to one of skill in the art in possession of the present disclosure in order to identify a service being requested from those identified as "provided" services in the service library. As such, at block 808, the service management subsystem 706 may determine that the service identified in the service request is identified as a "provided" service in the service library, and may operate at block 810 to perform service provisioning request transmission operations 1200 that include transmitting a service provisioning request to the SCP device 708.

Figure 12A:
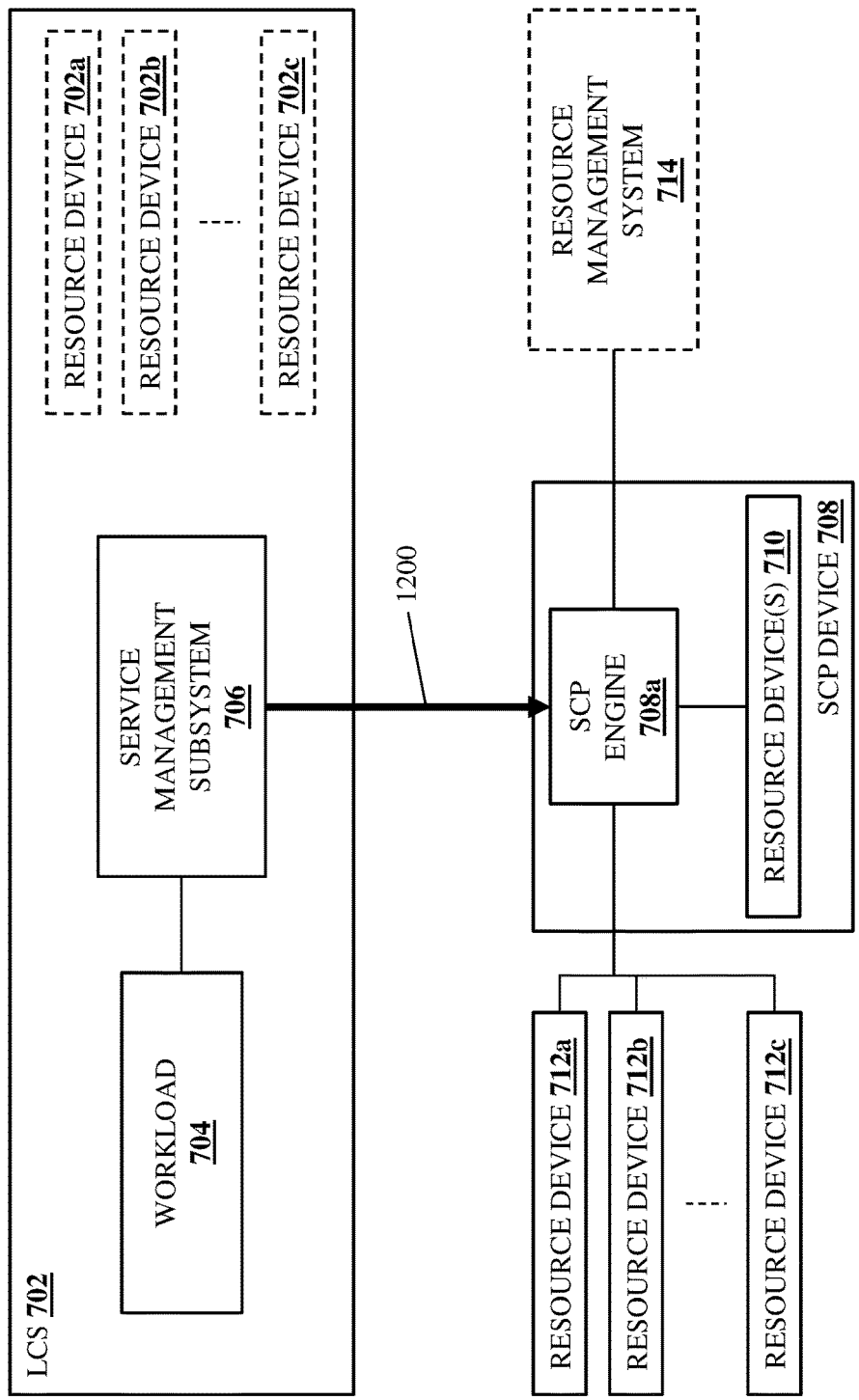
FIG. 12A is a schematic view illustrating an embodiment of the LCS workload in-band service management system of FIG. 7 operating during the method of FIG. 8.
Figure 12B:
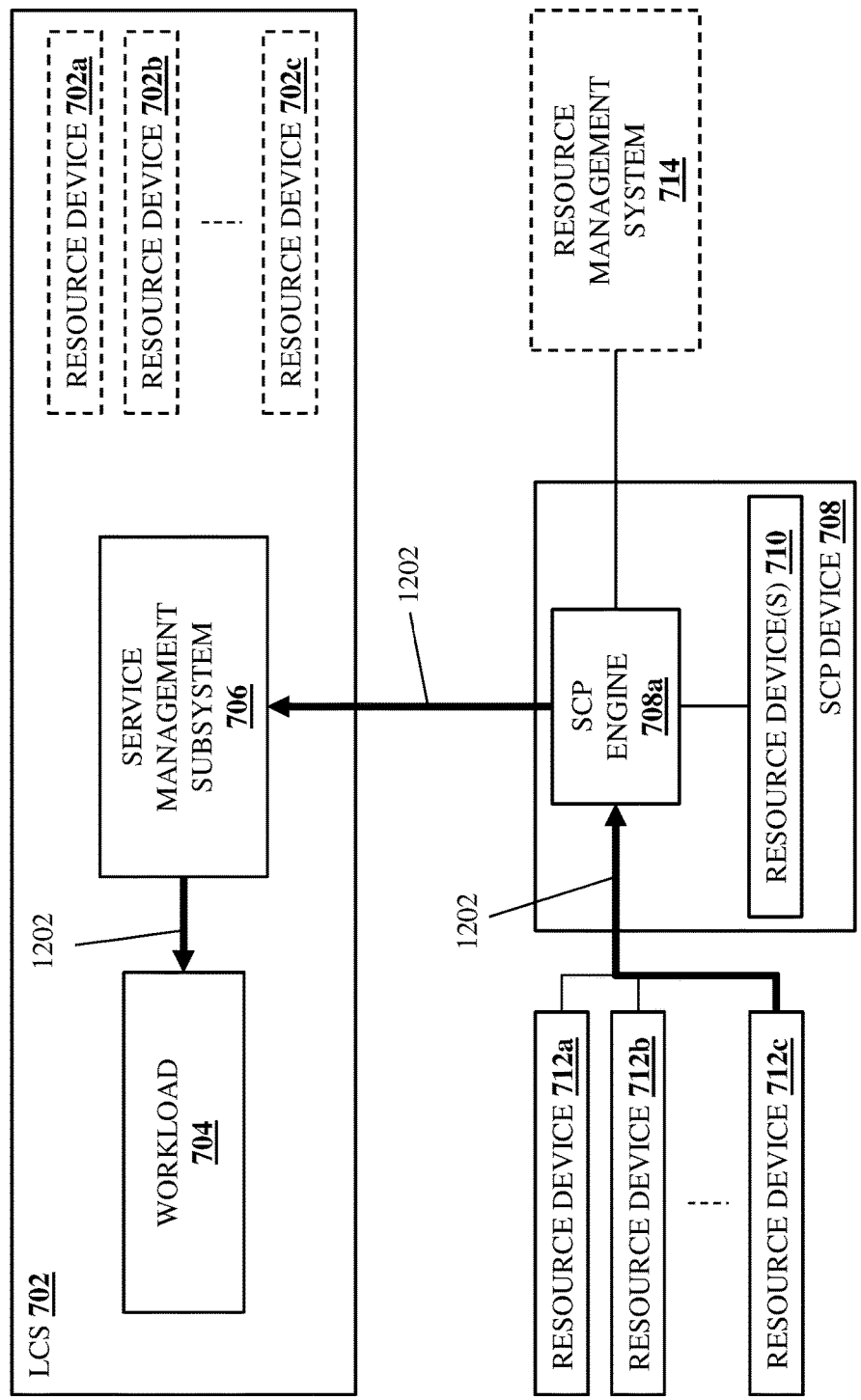
FIG. 12B is a schematic view illustrating an embodiment of the LCS workload in-band service management system of FIG. 7 operating during the method of FIG. 8.

In response to receiving the service provisioning request, the SCP engine 708a in the SCP device 708 may operate to have the requested service performed for the LCS for utilization by the workload 704. With reference to FIG. 12B, in a specific example and at block 810, the SCP engine 708a may perform service provisioning operations 1202 that include having a service be performed by the resource device 712c for utilization by the workload 704, and while FIG. 12B illustrates of the performance that service via the service management subsystem 706, one of skill in the art in possession of the present disclosure will appreciate how the SCP device 708 may have the service performed by the resource device 712c for the LCS 702 for utilization by the workload 704 in a variety of manners that will fall within the scope of the present disclosure as well. As such, one of skill in the art in possession of the present disclosure will appreciate how the workload 704 may request and have any service identified in the service library presented by the service management subsystem 706 performed via the service requests discussed above.

Figure 13A:
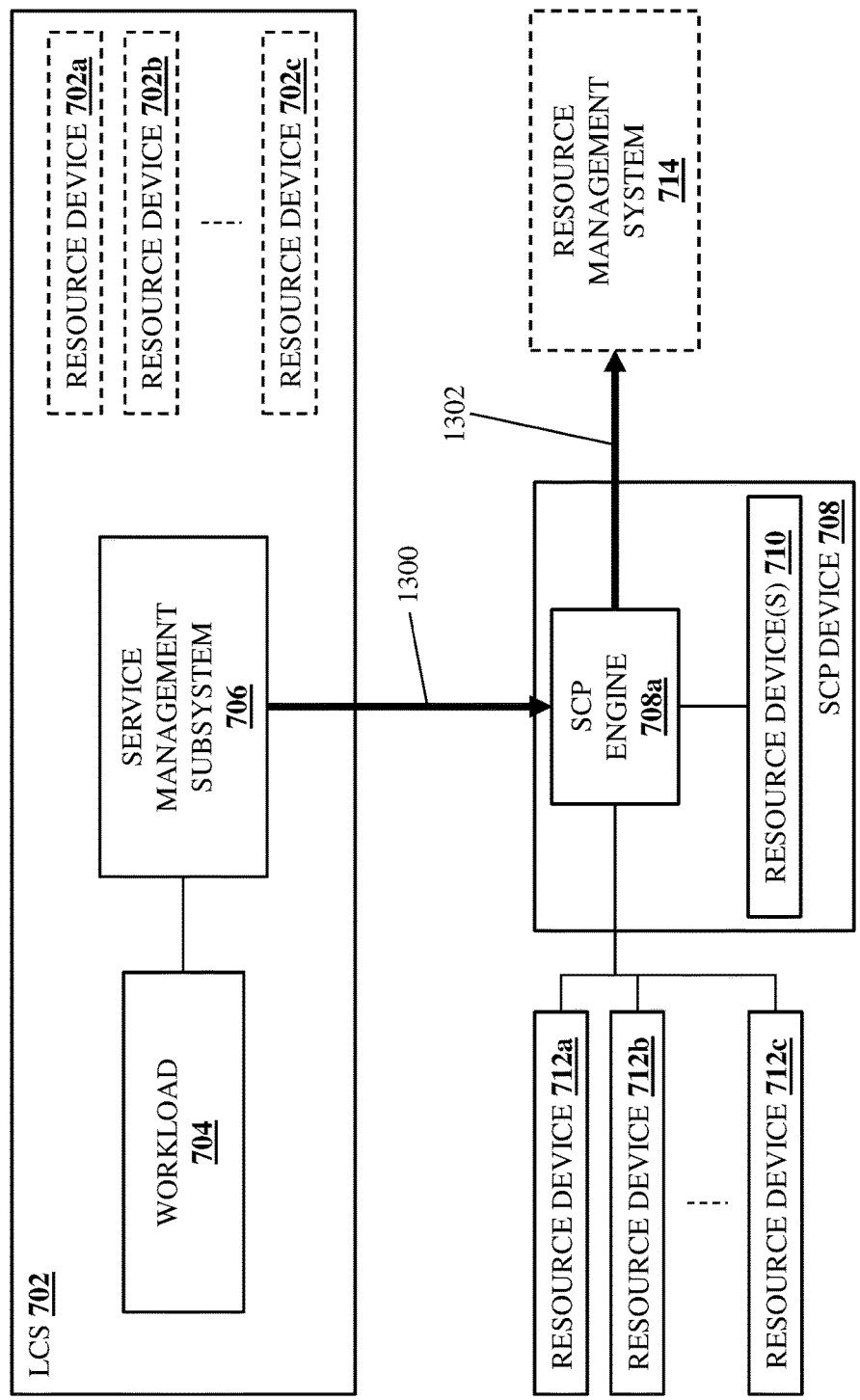
FIG. 13A is a schematic view illustrating an embodiment of the LCS workload in-band service management system of FIG. 7 operating during the method of FIG. 8.
Figure 13B:
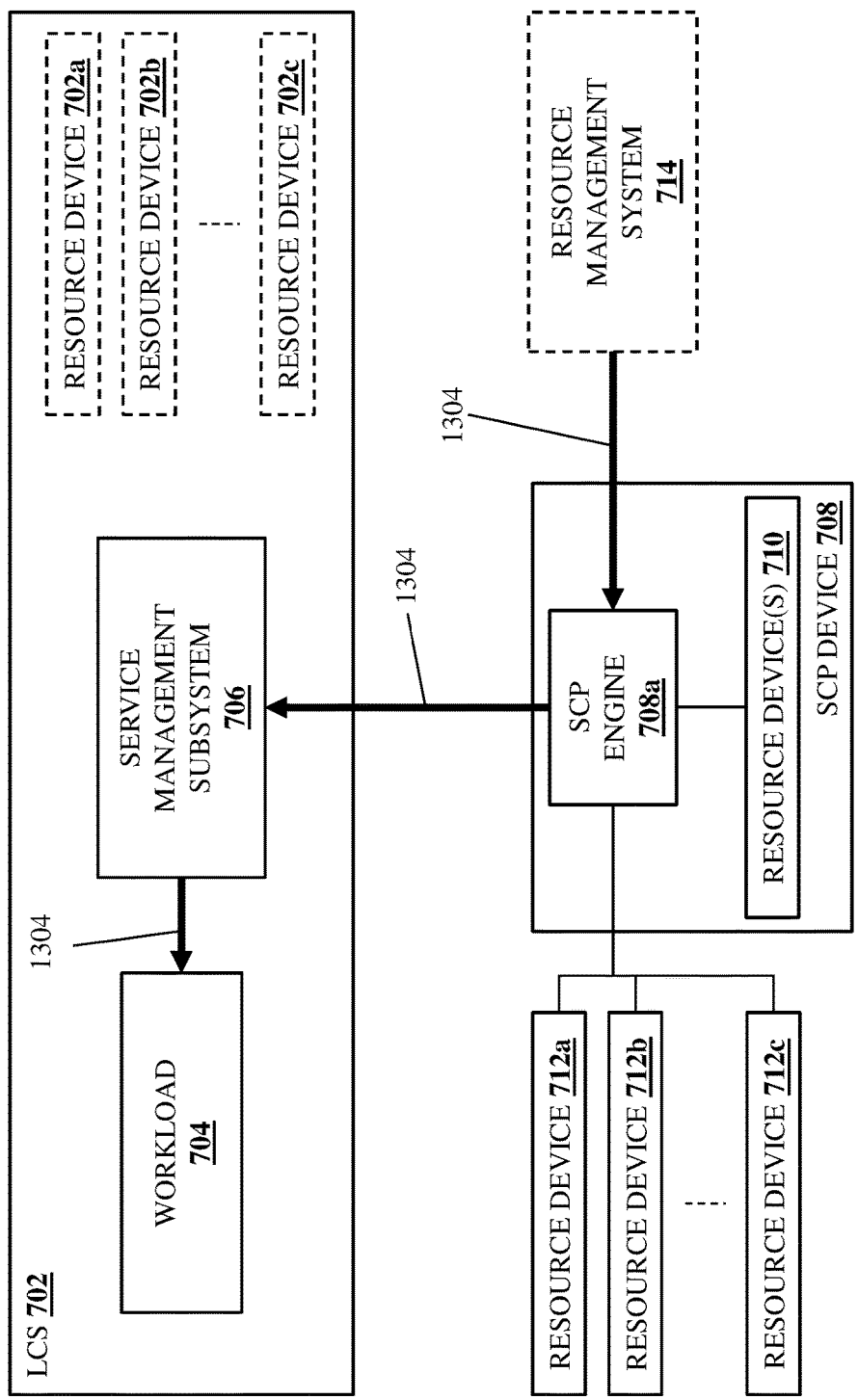
FIG. 13B is a schematic view illustrating an embodiment of the LCS workload in-band service management system of FIG. 7 operating during the method of FIG. 8.

If, at decision block 808, it is determined that the service (s) identified in the service request are not identified as "provided" service(s) in the service library (e.g., they are identified as "available" service(s)), the method 800 proceeds to block 812 where the service management subsystem communicates with the SCP device to provide service(s) that were requested via the service request and that are identified as "available" services in the service library. In an embodiment of block 806, the operating system or application providing the workload 704 may provide the service request for the service that is identified as an "available" service in the service library, and at block 808 the service management subsystem 706 may determine that the service identified in the service request is identified as an "available" service in the service library and may operate at block 812 to perform available service request transmission operations 1300 that include transmitting an available service request to the SCP device 708. To provide a specific example, the resource device 702a may include a storage volume, and at block 806 the workload 704 may request a "snapshot" service that generates a copy of that storage volume and that is identified as an "available" service in the service library. In response to receiving the available service request, the SCP engine 708a in the SCP device 708 may perform available service instruction provisioning operations 1302 to provide an available service instruction to the resource management system 714. With reference to FIG. 13B, in response to receiving the available service request, the resource management system 714 may provide the service being requested by the workload 704 (e.g., the snapshot service discussed above that may be performed by any resource device in any resource system in the LCS provisioning system as discussed above).

The method 800 then proceeds to block 814 where the service management subsystem presents the workload with an updated service library. With reference to FIG. 13B, in an embodiment of block 814 and in response to providing the service, the resource management system 714 may perform requested service identification operations 1304 that include identifying the requested service that was provided to the SCP device 708, the SCP device 708 identifying that requested service to the resource management subsystem 706, and the resource management subsystem 706 presenting the workload 704 with an updated service library that identifies that requested service as a "provided" service and provides corresponding API information for that requested service (e.g., a "snapshot" service in the specific example provided above). However, while a specific technique for identifying a requested service that was found by the resource management system 714 to the workload has been described, one of skill in the art in possession of the present disclosure will recognize how such found services may be identified to the workload 704 in a variety of manners that will fall within the scope of the present disclosure as well. As such, one of skill in the art in possession of the present disclosure will appreciate how the workload 704 may request services identified as "available" services in the service library, and may be provided with any of those services such that they then are identified as "provided" service via the service library, in response to those services being provided by the resource management system 714.

The method 800 then proceeds to block 810 where the service management subsystem provides the SCP device a service provisioning request that causes the SCP device to provide service(s) for the LCS for utilization by the workload. In an embodiment, at block 810 and in response to being presented with the updated service library that identifies the service that was initially identified as an "available" service in the service library, the workload 704 may perform service request provisioning operations 1306a that include providing a service request by interfacing with the API service provided by the service management subsystem 706 (e.g., utilizing an application plug-in subsystems such as a Kubernetes plugin when necessary) to generate an API call to a service identified as a "provided" service in the updated service library using its corresponding API information in that updated service library, and/or performing other operations using the updated service library that would be apparent to one of skill in the art in possession of the present disclosure in order to identify the service being requested from those identified in the updated service library. As such, continuing with the specific example provided above, the workload 704 may provide a request for a snapshot service in order to take a snapshot of a storage volume provided by the resource device 702a.

Figure 13C:
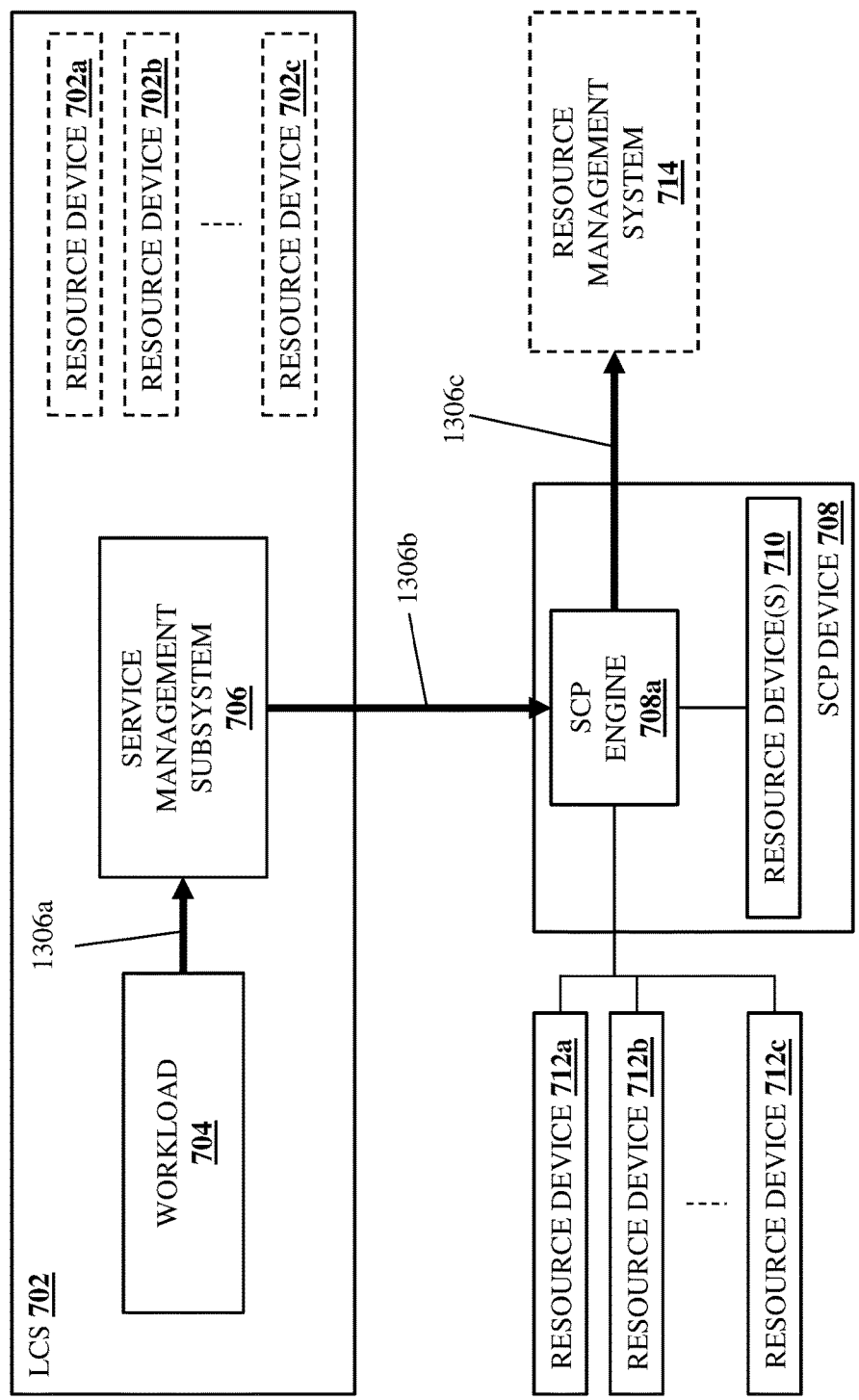
FIG. 13C is a schematic view illustrating an embodiment of the LCS workload in-band service management system of FIG. 7 operating during the method of FIG. 8.
Figure 13D:
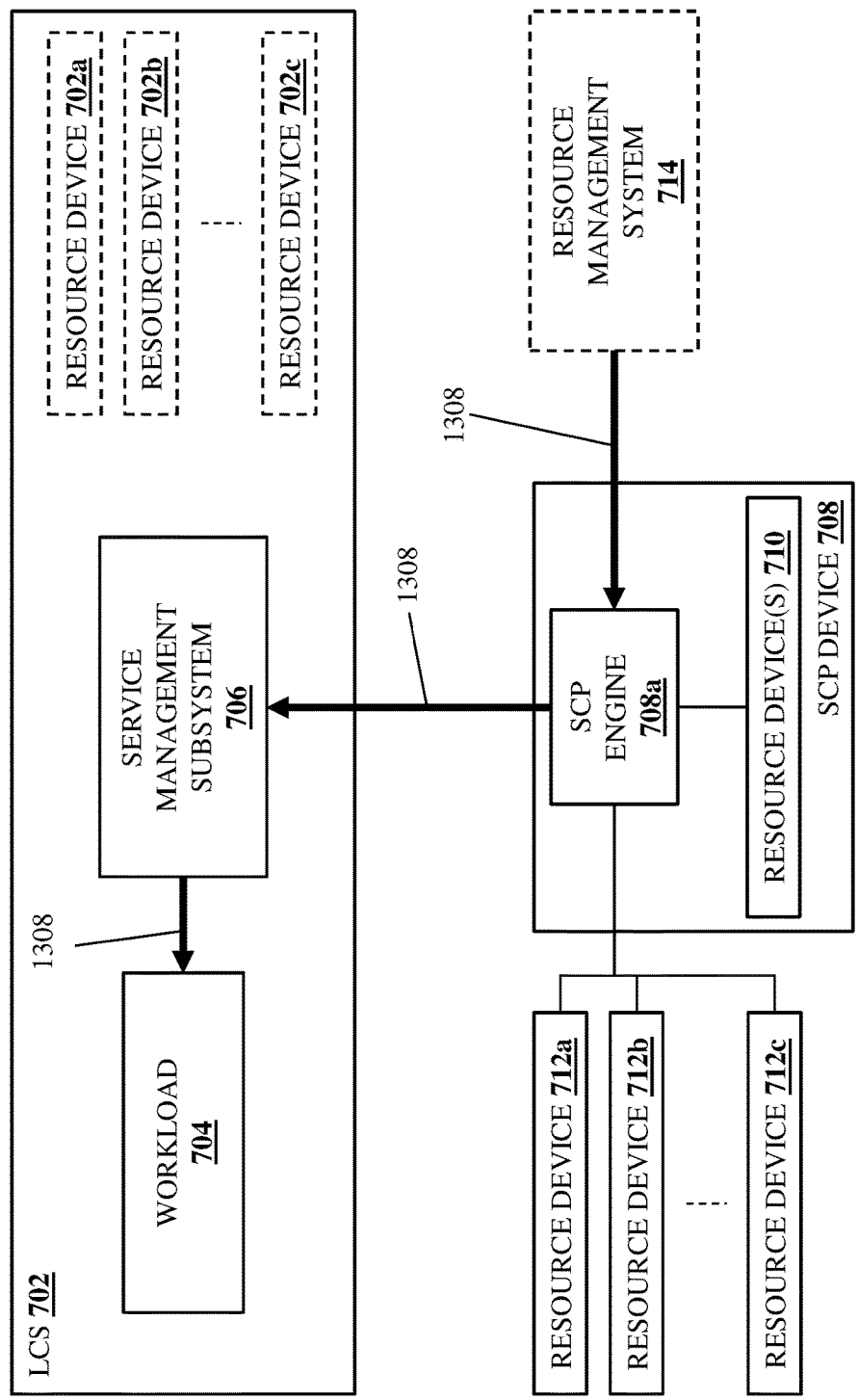
FIG. 13D is a schematic view illustrating an embodiment of the LCS workload in-band service management system of FIG. 7 operating during the method of FIG. 8.

With reference to FIG. 13C, in response to receiving the service request, the service management subsystem 706 may perform service provisioning instruction transmission operations 1306b that include transmitting a service provisioning instruction to the SCP device 708. For example, as discussed above, the SCP device may act as an API endpoint for API calls generated by the workload 704, and thus may receive the service provisioning instruction as the API call provided by the API service in the resource management subsystem 706. In response to receiving the service provisioning instruction, the SCP engine 708a in the SCP device 708 may perform service provisioning instruction forwarding operations 1306c to forward the service provisioning instruction to the resource management system 714. With reference to FIG. 13D, in an embodiment of block 810 and in response to receiving the service provisioning instruction, the resource management system 714 may perform service provisioning operations 1308 that include providing a service that is performed by a resource device that is accessible to the resource management system 714 for utilization by the workload 704, and while FIG. 13D illustrates that provisioning of that service via the service management subsystem 706, one of skill in the art in possession of the present disclosure will appreciate how the resource management system 714 and the SCP device 708 may provide the service performed by the resource device that is accessible to the resource management system 714 and to the LCS 702 for utilization by the workload 704 in a variety of manners that will fall within the scope of the present disclosure as well. Continuing with the specific example provided above, the resource management system 714 may provide a snapshot service to the workload 704 in order to cause a snapshot to be taken of a storage volume provided by the resource device 702a. As such, one of skill in the art in possession of the present disclosure will appreciate how the workload 704 may request and be provided with any service that is initially identified as an "available" service in the service library presented by the service management subsystem 706 via the service requests discussed above.

While the requesting and provisioning of a single service to a workload using the service library/updated service library is described above, one of skill in the art in possession of the present disclosure will appreciate how more complex services may be provided to workloads while remaining within the scope of the present disclosure as well. For example, a workload may require a complex service made up of a plurality of services, and in some cases the plurality of services that make up the complex service may include a subset of services that are identified as "provided" services in the service library, and/or a subset of services that are initially identified as "available" services in the service library. As such, the method 800 may be performed substantially as described above in order to provide the workload the services it needs for the complex service that were initially identified as "provided" services in the service library, as well as provide the services it needs for the complex service that were initially identified as "available" services in the service library, which allows the complex service to be constructed using those services and utilized by the workload. To provide a relatively simplified example, the complex service may require 1) a data compression service, 2) a data copying service, and 3) a redundant data storage/backup service, and that complex service may be constructed using services substantially as described above, and then utilized by the workload as needed.

Thus, systems and methods have been described that provide for the identification of services to a workload on an LCS, as well as the enablement of in-band management of those services by the workload. For example, the LCS workload in-band service management system of the present disclosure may include a service management subsystem coupled to a workload that is provided using an LCS, and an SCP device. The service management subsystem determines a plurality of services that are available via the SCP device for use by the LCS, and presents a service library to the workload that identifies the plurality of services. If the service management subsystem receives a first service request from the workload for a first service that is included in the plurality of services identified in the service library, it provides a first service provisioning request to the SCP device that is configured to cause the SCP device to provide the first service to the LCS for utilization by the workload. As such, the workload on the LCS may utilize in-band communications to request services in order to be provided those services as its service requirements change.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Logically Composed System (LCS) workload in-band service management system, comprising:
   a Logically Composed System (LCS) that is provided using an operating system provided by a processing system and a memory system in a Bare Metal Server (BMS), and using first resource devices that are included in the BMS and that are coupled to the BMS via a network;
   a workload performed by the LCS via the operating system and using first services provided by the first resource devices;
   a System Control Processor (SCP) device; and
   a service management subsystem that is provided by the LCS, that is coupled to the workload and the SCP device, and that is configured to:
      discover a plurality of second services that are either provided by or available via the SCP device for use by the LCS from second resource devices that are different than the first resource devices and that are not being used by the LCS to perform the workload when the plurality of second services are discovered;
      present, to the workload, a service library that includes:
         identifiers for each of the plurality of second services that include provided services that are provided by the SCP device or available services that are available via the SCP device; and
         respective Application Programming Interface (API) information for each of the plurality of second services;
      receive, from the workload via an API service provided by the service management subsystem and a first API call using first API information included in the service library, a first service request for a first of the plurality of second services that is identified in the service library as a provided service and that is provided by at least one of the second resource devices that is coupled to the BMS via the network;
      provide, to the SCP device, a first service provisioning request that requests the first of the plurality of second services, wherein the SCP device is configured to:
         provide, in response to the first service provisioning request, the first of the plurality of second services to the LCS, and wherein the LCS is configured to:
            perform the workload using the first services and the first of the plurality of second services, wherein the workload is configured to:
               utilize the first of the plurality of second services;
      receive, from the workload via the API service provided by the service management subsystem and a second API call using second API information included in the service library, a second service request for a second of the plurality of second services that is identified as an available service in the service library and that is provided by at least one of the second resource devices that is coupled to the BMS via the network;
      provide, to the SCP device, a second service provisioning request that requests the second of the plurality of second services, wherein the SCP device is configured to:
         provide, in response to the second service provisioning request, the second of the plurality of second services to the LCS, and wherein the LCS is configured to:
            perform the workload using the first services and the second of the plurality of second services, wherein the workload is configured to:
               utilize the second of the plurality of second services, and
         present, to the workload in response to the second of the plurality of second services being provided to the LCS, an updated service library that identifies the second of the plurality of second services as a provided service, and includes the respective API information the second of the plurality of second services.

2. The system of claim 1, wherein the service management subsystem is provided by a resource device driver.

3. The system of claim 1, wherein the plurality of second services that include available services that are available via the SCP device are services that became available after the composition of the LCS.

4. The system of claim 1, wherein the SCP device is configured to operate as an API endpoint for the API service.

5. The system of claim 1, wherein the at least one of the second resource devices provides a storage volume.

6. The system of claim 5, wherein the second of the plurality of second services that is identified as an available service in the service library is snapshot service that is configured to generate a copy of the storage volume.

7. The system of claim 1, wherein the SCP device is configured to provide the first of the plurality of second services to the LCS for utilization by the workload in response to the first service provisioning request by:
   providing a first service provisioning instruction to a resource management system that is configured to cause the resource management system to provide the first of the plurality of second services to the LCS for utilization by the workload.

8. An Information Handling System (IHS), comprising:
   a processing system that is included in a Bare Metal Server (BMS); and
   a memory system that is included in the BMS, that is coupled to the processing system, and that includes instructions that, when executed by the processing system, cause the processing system to provide an operating system that is configured to provide a Logically Composed System (LCS) using first resource device that are included in the BMS and that are coupled to the BMS via a network, wherein the LCS performs a workload via the operating system and using first services provided by the first resource devices, and wherein the operating system includes a service management engine that is configured to:

discover a plurality of second services that are either provided by or available via a System Control Processor (SCP) device from second resource devices that are different than the first resource devices and that are not being used by the LCS to perform the workload when the plurality of second services are discovered;

present, to a workload provided using the LCS, a service library that includes:

identifiers for each of the plurality of second services that include provided services that are provided by the SCP device or available services that are available via the SCP device; and respective Application Programming Interface (API) information for each of the plurality of second services;

receive, from the workload via an API service provided by the service management subsystem and a first API call using first API information included in the service library, a first service request for a first of the plurality of second services that is identified in the service library as a provided service and that is provided by at least one of the second resource devices that is coupled to the BMS via the network;

provide, to the SCP device, a first service provisioning request that requests the first of the plurality of second services, wherein the first service provisioning request causes:

the SCP device to provide the first of the plurality of second services to the LCS;

the LCS to perform the workload using the first services and the first of the plurality of second services; and the workload utilize the first of the plurality of second services;

receive, from the workload via the API service provided by the service management subsystem and a second API call using second API information included in the service library, a second service request for a second of the plurality of second services that is identified as an available service in the service library and that is provided by at least one of the second resource devices that is coupled to the BMS via the network;

provide, to the SCP device, a second service provisioning request that requests the second of the plurality of second services, wherein the second service provisioning request causes:

the SCP device to provide the second of the plurality of second services to the LCS;

the LCS to perform the workload using the first services and the second of the plurality of second services; and the workload to utilize the second of the plurality of second services, and present, to the workload in response to the second of the plurality of second services being provided to the LCS, an updated service library that identifies the second of the plurality of second services as a provided service, and includes the respective API information the second of the plurality of second services.

9. The IHS of claim 8, wherein the service management engine is provided by a resource device driver.

10. The IHS of claim 8, wherein the plurality of second services that include available services that are available via the SCP device are services that became available after the composition of the LCS.

11. The IHS of claim 8, wherein the SCP device is configured to operate as an API endpoint for the API service.

12. The IHS of claim 8, wherein the at least one of the second resource devices provides a storage volume.

13. The IHS of claim 12, wherein the second of the plurality of second services that is identified as an available service in the service library is snapshot service that is configured to generate a copy of the storage volume.

14. A method for in-band management of services by a workload provided on a Logically Composed System (LCS), comprising:

providing, by an operating system provided by a processing system and a memory system in a Bare Metal Server (BMS), an LCS using first resource device that are included in the BMS and that are coupled to the BMS via a network;

performing, by the LCS, a workload via the operating system and using first services provided by the first resource devices;

discovering, by a service management subsystem included in the operating system, a plurality of second services that are either provided by or available via a System Control Processor (SCP) device from second resource devices that are different than the first resource devices and that are not being used by the LCS to perform the workload when the plurality of second services are discovered;

presenting, by the service management subsystem to a workload provided using the LCS, a service library that includes:

identifiers for each of the plurality of second services that include provided services that are provided by the SCP device or available services that are available via the SCP device; and respective Application Programming Interface (API) information for each of the plurality of second services;

receiving, by the service management subsystem from the workload via an API service provided by the service management subsystem and a first API call using first API information included in the service library, a first service request for a first of the plurality of second services that is identified in the service library as a provided service and that is provided by at least one of the second resource devices that is coupled to the BMS via the network;

providing, by the service management subsystem to the SCP device, a first service provisioning request that requests the first of the plurality of second services, wherein the first service provisioning request causes the SCP device to provide the first of the plurality of second services to the LCS;

performing, by the LCS, the workload using the first services and the first of the plurality of second services;

utilizing, by the workload, the first of the plurality of second services;

receiving, by the service management subsystem from the workload via the API service provided by the service management subsystem and a second API call using second API information included in the service library, a second service request for a second of the plurality of second services that is identified as an available service in the service library and that is provided by at least one of the second resource devices that is coupled to the BMS via the network;

providing, by the service management subsystem to the SCP device, a second service provisioning request that requests the second of the plurality of second services, wherein the second service provisioning request causes the SCP device to provide the second of the plurality of second services to the LCS;

providing, in response to the second service provisioning request, the second of the plurality of second services to the LCS, and wherein the LCS is configured to:

performing, by the LCS, the workload using the first services and the second of the plurality of second services;

utilizing, by the workload, the second of the plurality of second services; and presenting, by the service management subsystem to the workload in response to the second of the plurality of second services being provided to the LCS, an updated service library that identifies the second of the plurality of second services as a provided service, and includes the respective API information the second of the plurality of second services.

15. The method of claim 14, wherein the service management subsystem is provided by a resource device driver.

16. The method of claim 14, wherein the plurality of second services that include available services that are available via the SCP device are services that became available after the composition of the LCS.

17. The method of claim 14, wherein the SCP device is configured to operate as an API endpoint for the API service.

18. The method of claim 14, wherein the at least one of the second resource devices provides a storage volume.

19. The method of claim 18, wherein the second of the plurality of second services that is identified as an available service in the service library is snapshot service that is configured to generate a copy of the storage volume.

20. The method of claim 14, further comprising:
providing, by the SCP device in the response to the first service provisioning request, a first service provisioning instruction to a resource management system to cause the resource management system to provide the first of the plurality of second services to the LCS for utilization by the workload.

* * * * *